United States Patent [19]

Shutt

[11] Patent Number: 5,087,080
[45] Date of Patent: Feb. 11, 1992

[54] ARTHROSCOPIC SHEATH WITH QUICK COUPLING SOCKET

[75] Inventor: George V. Shutt, Glendora, Calif.

[73] Assignee: Zimmer Inc., Warsaw, Ind.

[21] Appl. No.: 524,945

[22] Filed: May 18, 1990

Related U.S. Application Data

[62] Division of Ser. No. 305,887, Feb. 2, 1989, Pat. No. 4,951,977.

[51] Int. Cl.[5] .............................. F16L 55/00
[52] U.S. Cl. ................................ 285/5; 285/27; 285/133.1; 604/165; 604/166
[58] Field of Search ............... 604/165, 166, 169, 264; 285/5, 27, 900, 924, 133.1, 314, 315, 308, 316

[56] References Cited

U.S. PATENT DOCUMENTS

| | | | |
|---|---|---|---|
| 965,286 | 7/1910 | Ferguson | 285/314 X |
| 1,213,001 | 1/1917 | Philips | 604/165 |
| 2,475,635 | 12/1949 | Parsons | 285/133.1 |
| 3,399,674 | 9/1968 | Pannier et al. | 604/165 |
| 3,487,834 | 1/1970 | Smith et al. | 604/165 X |
| 3,994,287 | 11/1976 | Turp et al. | 604/169 |
| 4,016,879 | 4/1977 | Mellor | 604/169 X |
| 4,249,541 | 2/1981 | Pratt | 604/165 X |
| 4,601,710 | 7/1986 | Moll | 604/165 |
| 4,627,841 | 12/1986 | Dorr | 604/165 X |

Primary Examiner—Randolph A. Reese
Assistant Examiner—Heather Chun
Attorney, Agent, or Firm—Gene Warzecha

[57] ABSTRACT

A tubular arthroscopic sheath having improved irrigating fluid flow characteristics and having a quick coupling socket adapted to quickly connect to and disconnect from an associated arthroscopic tool provided with a mateable, generally cylindrical plug member. The fluid flow is enhanced by centering projections on the sheath interior and by turbulence minimizing fluid ports. The socket comprises an open ended cylindrical housing provided with a plurality of annularly spaced, cylindrical locking pins slidable within throughbores in the housing wall, the throughbores extending radially from the housing axis and axially skewed with respect thereto. Each pin is provided with a notch in its cylindrical surface adjacent the most radially outward end of the pin. A pair of slidable coaxial cylindrical actuating members is adapted to engage all the notches and capture the pins. Moving the slidable actuating members away from the open end of the housing causes the pins to slide radially outwardly in the throughbores. Allowing a bias means to urge the actuating members toward the open end of the housing causes the pins to slide radially inwardly.

1 Claim, 3 Drawing Sheets

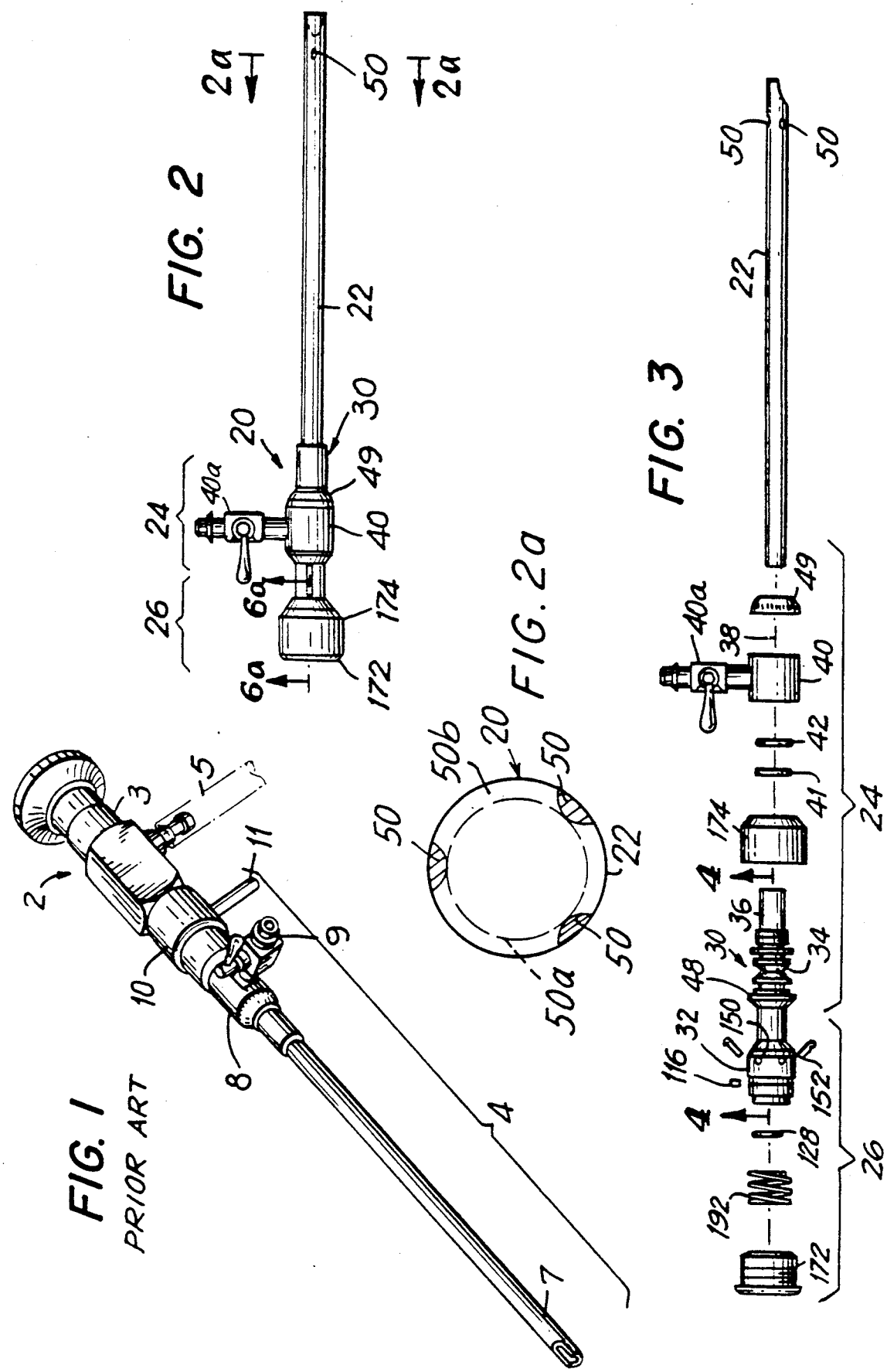

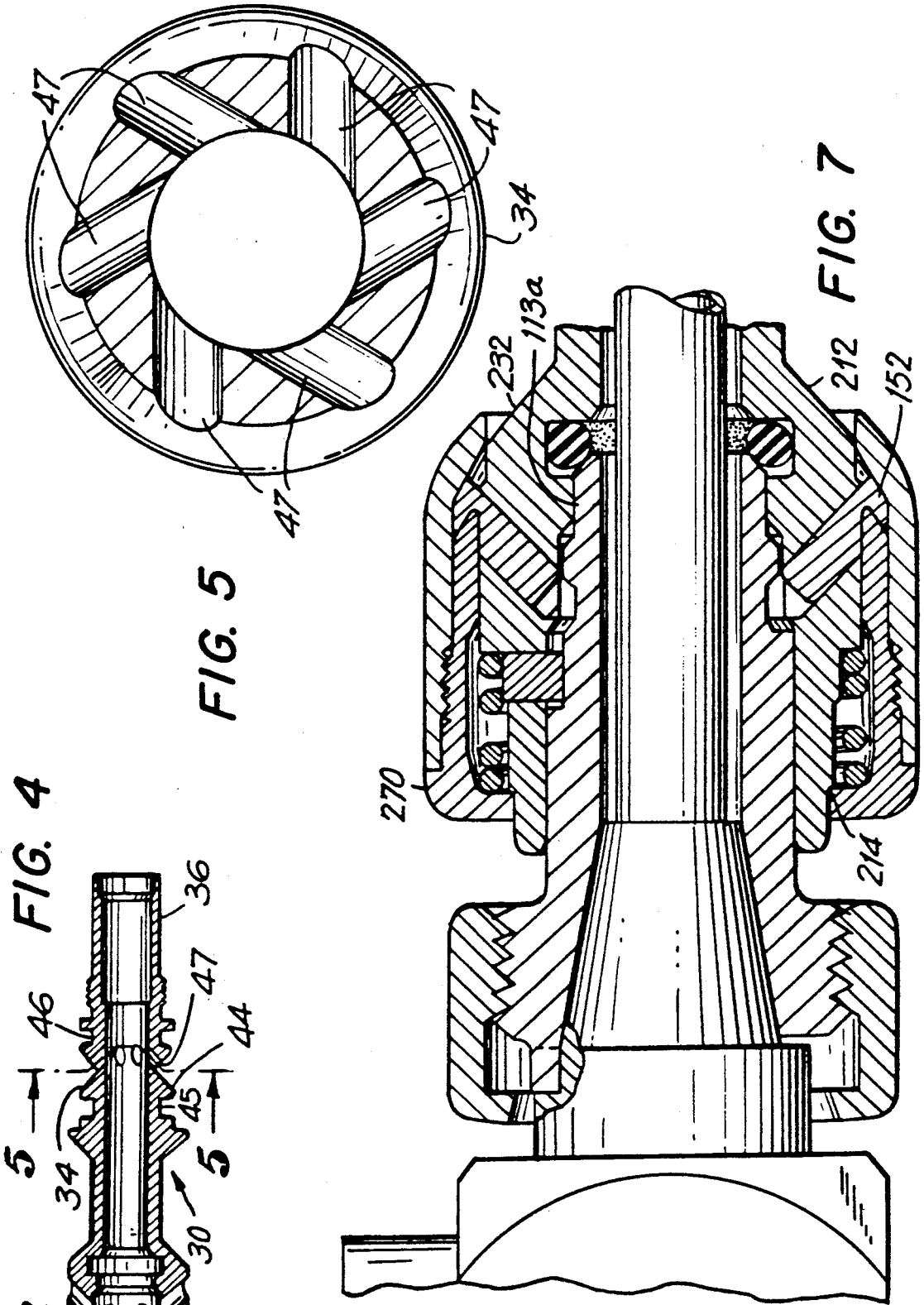

ARTHROSCOPIC SHEATH WITH QUICK COUPLING SOCKET

This is a division application of application Ser. No. 07/305,887 filed Feb. 2, 1989 now U.S. Pat. No. 4,951,977.

BACKGROUND OF THE INVENTION

1. Field of the Invention

The invention relates to arthroscopic systems and to couplings for quickly connecting and disconnecting coaxial sockets and associated plugs. More particularly, the invention relates to an arthroscopic sheath having a quick coupling socket for use with a suitably adapted plug member associated with a tool to be received in the sheath.

2. Description of the Prior Art

As will be noted below, arthroscopy is an established medical procedure. Existing arthroscopes, however, are in need of improvements in efficiency of operation and it is such improvements with which this invention is concerned.

As will be explained below, it is desirable to utilize "quick couplings" in arthroscopic applications. Quick connecting couplings (joining male plugs and female sockets) have been known for quite some time in hydraulic and fluidic applications, althoug all known prior art quick coupling devices are, for various reasons, unsuitable for arthroscopic purposes. This invention relates in part to improvements in quick connect couplings to provide couplings suitable for arthroscopic applications as well as for conventional uses of such devices. A brief description of arthroscopy will aid in understanding the invention.

An arthroscope is a miniaturized tubular optical device which allows a surgeon to observe internal areas of a patient, up to several inches inside the body, and to perform both inspection and surgery through an incision of only about ¼ inch. Fiber optic means are provided to illuminate the operating area inside the body. Arthroscopic devices and the associated surgical methodology have been developed primarily for the purpose of arthroscopic knee surgery, although it is becoming increasingly commonplace to use this minimally traumatic procedure on other joints and areas of the body.

To use the arthroscope the surgeon typically makes three small (¼") incisions: one for observation via the arthroscope, a second for the surgical cutting devices and a third for removing the irrigating saline solution used to keep the knee (or other area being operated upon) distended and to flush away blood and other debris. Next, a sharp obturator in inserted and locked into a tubular arthroscope sheath to effectively fill up the entire inside of the sheath and form essentially a solid rod with a sharp, pointed end that extends beyond the sheath. This combination sheath/obturator enables forced insertion of the arthroscopic sheath through the incision into the area to be examined. After the sheath is positioned, the sharp obturator is removed and the arthroscope inserted and locked to the sheath. It is this locking mechanism, further discussed below, with which this invention is in part concerned.

The sheath is a tube, several inches long, which forms a guide and holder for the arthroscope and various tools and remains in place throughout the procedure. The arthroscope is basically an eyepiece which may be viewed directly or, alternatively, a miniature camera may be attached to or replace the eyepiece. Fibre optic means are provided, coaxially surrounding the viewing optics, in order to illuminate the operating area. The sheath may also be provided with an irrigating fluid port through which saline solution is pumped into or out of the space between the sheath and arthroscope tube and ultimately to and from the operating area. The saline is prevented from passing out of the sheath past the eyepiece by an arrangement of O-rings. In known prior art arthroscopic sheaths coaxial alignment is not always precise, resulting in the cylindrical space between the arthroscope and the sheath not being uniform throughout the length of the sheath because of improper alignment of the arthroscope within the sheath. This affects the "feel" and operation of the arthroscope. "Play" between the distal end of the scope of the sheath compromises the "feel" of this instrument to the surgeon. Also, the volume and velocity of fluid flowing in the tube is not necessarily annularly uniform. Consequently, if flow happens to be reduced to the viewing side of the arthroscope, there is a possibility that the view will be impaired by debris. Therefore, there is a need for an arthroscopic device capable of avoiding this deficiency. As will be shown below, the invention provides such a device by enabling the centering of the arthroscope within the sheath and by enabling increased fluid flow due to modifications to the irrigation holes.

In the course of the surgery, the arthroscope may be changed or removed from the sheath to allow rapid flushing or to move the sheath to one of the other holes. The scopes utilized may have a variety of different viewing angles from straight ahead to approximately a right angle and during the surgery a variety of scopes may be used. An average of approximately four devices are routinely inserted into the sheath and removed, perhaps many times during a surgery, and each must be coupled and uncoupled from the sheath each time.

Prior art arthroscopes typically utilize a rotatable locking coupling collar on the sheath in order to couple the scope to the sheath. The collar has a lever-type handle protruding a significant distance and the coupling and uncoupling is accomplished by manually moving this handle within a range of approximately 45°. Often the surgeon will bump the handle accidentally thereby partially or completely disconnecting the scope, resulting in distraction, delay, accidents and/or water leakage. A less obstrusive locking mechanism is, therefore, desirable. Additionally, this conventional coupling mechanism requires the surgeon to carefully align marks on the scope and sheath. Arthroscopic surgery demands extreme concentration viewing the operating area on a video screen while observing the manipulations of the surgical cutting instruments and any extra burden on the surgeon is undesirable. Consequently, an improved quick coupling and uncoupling device is highly desirable.

There are no known prior art quick coupling devices which overcome the foregoing disadvantages and which are suitable for arthroscopic coupling devices. Prior art quick couplings, used generally in the hydraulic and fluidic arts, are not suitable for arthroscopic purposes for a variety of reasons. First of all, known quick couplings are relatively bulky and unable to be sufficiently reduced in size to be suitable for arthroscopic applications. There appears to be a relationship between the diameters of the inside and outside of known couplings. There is a certain minimum inside diameter which is necessary to accomodate the plug member or whatever is to be received within the socket. There is also a certain minimum outside diameter necessary to accomodate the actuating components of quick couplings. The structure of known prior art couplings make the ratio of outside diameter to inside diameter unacceptably large for arthroscopic applications.

For example, U.S. Pat. No. 3,666,300 (Russell) shows a fluid line quick disconnect coupling. The coupling comprises a housing containing a plurality of annularly spaced locking pins and an outer actuating sleeve which is slidable on the housing in order to move the pins. Sliding the actuating sleeve forwardly causes the sleeve to engage an annular shoulder on each pin in order to move the pins radially outwardly to enable a nipple to be inserted into the socket. Sliding the sleeve rearwardly, after the nipple has been inserted, causes the sleeve to push against each pin to move it radially inwardly thereby locking the nipple in place. The structure of this device necessitates a relatively large diameter actuating sleeve. The sliding pins are fairly large and require large throughbores in the cylindrical housing thereby affecting the structural strength of the housing. In order to compensate for this loss of strength, the housing must be made large, resulting in a heavy, large diameter coupling device. Also, the particular design of the interacting surfaces on the actuating sleeve and the pins requires that the pins be of relatively large diameter which, in addition to requiring larger throughbores also makes the pins protrude radially outwardly a significant distance beyond the external surface of the cylindrical housing.

An additional disadvantage of this type of prior art quick coupling devices is that the plurality of annularly arranged locking pins generally used are retained within the socket by a separate member. In the Russell-type device this member is a split ring situated adjacent the radially inward end of the pins. The use of any such extra retaining members not only adds to cost and complexity but presents an additional component which could malfunction and, in the case of arthroscopic applications, any such malfunction may pose a serious safety hazard by enabling the pin or retaining member to fall into the patient.

Known arthroscopic sheaths are capable of being easily disassembled and it is, therefore, difficult for the surgeon to know if the device has been tampered with. This obviously creates a liability hazard for the surgeon. It would, therefore, be desirable to provide an arthroscopis sheath not easily disassembled without special tools.

Other known quick couplings, such as that shown in U.S. Pat. No. 3,188,123 (Hansen), require an interior actuating sleeve which is slidable relative to the housing and the nipple. Such designs require extra manufacturing steps to assure necessary close tolerances. It is impractical to reduce the size of these devices to that suitable for arthroscopic applications while simultaneously maintaining the critical tolerances necessary for arthroscopic purposes. Moreover, there are no known prior art quick couplings which are provided with a capability for accurately directly aligning the socket and plug members which are to be joined.

Accordingly, it is an object of the present invention to provide a quick coupling device suitable for arthroscopic purposes and capable of enabling quick, aligned connection and disconnection of a socket and associated plug member.

It is yet another object of this invention to provide a quick coupling device for joining a socket and plug member in a predetermined alignment. It is still a further object of this invention to provide a quick coupling device for so joining a socket and plug member without the need to have the user view either the socket or plug member.

It is additionally an object of this invention to provide a quick coupling device having a relatively small ratio of outside diameter to inside diameter, with minimum bulk and weight.

It is still another object of this invention to provide a quick coupling device utilizing a plurality of annularly spaced locking pins and having means for limiting the possibility that the integrity of the device may be compromised by disassembly by the user or that any part of the coupling device could fall into the interior of the device.

It is yet another object of this invention to provide an arthroscopic sheath which enhances the flow of irrigating fluid to or from the operating area.

SUMMARY OF THE INVENTION

These and other objects of this invention are achieved by the preferred embodiment of a quick connect coupling disclosed herein. One embodiment of the invention is an improved arthroscopic sheath having a quick coupling socket adapted for receiving therein and locking thereto an associated cylindrical plug member, said socket comprising: a tubular cylindrical housing having a rear open end for receiving the associated plug member and a front end for being operatively connected to a selected member, said cylindrical housing provided with a plurality of annularly arranged and circumferentially spaced throughbores extending radially outwardly from the axis of said cylindrical housing and skewed axially away from the rear end thereof; a plurality of locking pins, each respectively situated within one of said throughbores and slidable therein, each pin comprising: a generally cylindrical member having at its most radially inward end a first end surface and, at its other end, a second end surface oriented at a first predetermined angle relative to the axis thereof, said cylindrical member having a notch formed substantially in its rearwardly facing cylindrical surface adjacent said second end surface, said notch comprising a first surface oriented at a second predetermined angle relative to the axis of said cylindrical member and a second surface oriented substantially parallel to the axis of said cylindrical housing; a slidable cylindrical actuating assembly mounted coaxially to and radially outwardly of said cylindrical housing, said actuating assembly comprising: an inner actuating sleeve having a first annular end comprising a radially inwardly directed first annular flange slidably situated on the external surface of said cylindrical housing adjacent said rear end thereof, a second annular end proximate to and selectively engageable with the first surface of the notch of each of said cylindrical members, a spring means interposed between said first annular flange and said external surface of said first cylindrical housing for maintaining rearward bias therebetween; an outer actuating sleeve attached to and movable with said inner actuating sleeve, said outer actuating sleeve comprising, adjacent its front end, an annular retaining surface abutting each of said second end surfaces of said cylindrical members, the front ends of said inner and outer actuating sleeves being spaced a predetermined distance to enable said pins to move relative to same as said actuating assembly is moved relative to said housing.

Other objects of the invention are achieved by the embodiment of an improved arthroscopic sheath which also comprises at least three centering projections extending radially inwardly at the distal end of the sheath to align the axis of an arthroscope with the axis of the sheath.

The improved arthroscopic sheath also comprises angled and offset irrigation holes in its fluid entry portion for producing a minimum turbulent, spiral fluid flow path for the irrigating fluid within the sheath.

BRIEF DESCRIPTION OF THE DRAWINGS

FIG. 1 is a diagrammatic perspective view of a conventional arthroscope and sheath connected to a fiber optic light guide.

FIG. 2 is a side elevational view of an improved arthroscopic sheath constructed in accordance with the principles of this invention.

FIG. 2a is a cross-sectional view of FIG. 2 taken along the line 2a—2a.

FIG. 3 is an exploded side elevational view of FIG. 2.

FIG. 4 is a view of a portion of FIG. 3 taken along the line 4—4.

FIG. 5 is a cross-sectional view of FIG. 4 taken along the line 5—5.

FIG. 6b is a side elevational view of an adapter plug member mateable with the socket of FIG. 6a.

FIG. 7 shows an alternative embodiment of the socket of FIG. 6a mated to an alternative embodiment of the plug member of FIG. 6b and showing the socket in an un-locked configuration.

DESCRIPTION OF THE PREFERRED EMBODIMENT

Figure 6A:
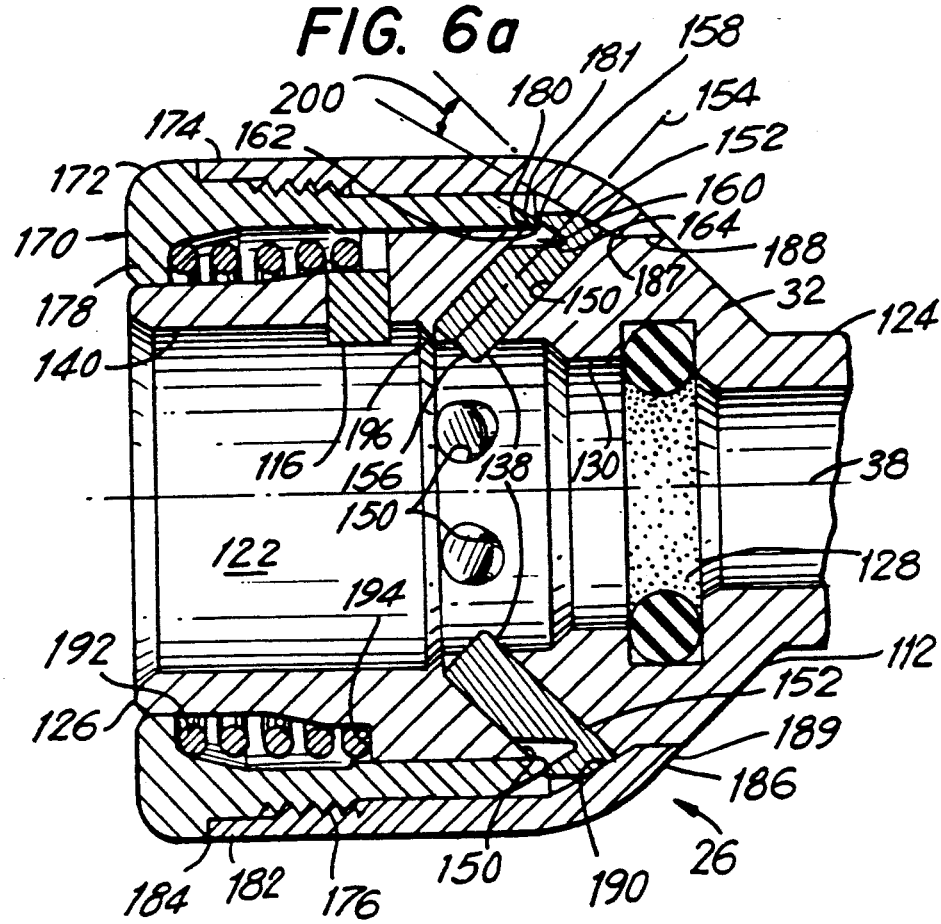
FIG. 6a is an enlarged cross-sectional view of the socket portion of FIG. 2 taken along the line 6—6 and showing the socket in a locked configuration.

A conventional arthroscope/sheath assembly 2 is shown in FIG. 1 in order to facilitate an understanding of the preferred embodiment of the invention. Assembly 2 comprises scope 3 secured to a conventional sheath 4 and includes a fiber optic guide 5 connected to the scope for providing illumination of the operating area. Sheath 4 comprises hollow tube 7 for receiving the tubular part of the arthroscope (not shown). Tube 7 is connected to a fluid inlet port 8 which is in turn joined to stopcock 9 designed to be connected to a source of irrigating fluid (not shown). Sheath 4 is secured to scope 3 via a locking collar 10 operated by rotatable handle 11.

An improved arthroscopic sheath 20 constructed in accordance with the principles of this invention is shown in FIG. 2 and, in FIG. 3 is shown in exploded form depicting internal components. Sheath 20 comprises a hollow tube 22, an irrigating fluid inlet portion 24 and a quick coupling portion 26. As best seen in FIG. 3, the preferred embodiment of the invention comprises a unitary tubular body 30 which provides elements for use by both fluid inlet portion 24 and quick coupling portion 26.

Body 30, as best seen in FIG. 4, comprises a socket housing 32, a fluid inlet core 34 and a sheath tube interface 36. Interface 36 is a relatively short, tubular part of body 30 which serves to hold tube 22 in alignment with the sheath axis 38. Fluid core 34 cooperates with cylindrical fluid housing 40 (attached to a conventional stopcock 40a as shown in FIGS. 2 and 3) and O-rings 41 and 42 to provide a fluid inlet into the interior of the sheath. Housing 40 is secured between flange 48 and threaded collar 49. Core 34 comprises an enlarged portion 44 of body 30 set between a pair of O-ring grooves 45 and 46 which receive O-rings 41 and 42, respectively. Portion 44 is provided with a plurality of circumferentially spaced bores 47 through which irrigating fluid is communicated from the stopcock to the sheath interior. Each of the bores is, as best seen in FIGS. 4 and 5, angled toward the front of the frame and arcuately tilted relative to the circumferential surface of portion 44 in order to induce a spiral fluid flow with minimum impingement and turbulence. As best seen in FIG. 2a, the fluid flow is further enhanced by three projections 50 circumferentially spaced about the internal surface of tube 22 adjacent its tip in order to center the distal end of any arthroscope or tool 50a (shown in phantom) inserted therein. It will be understood that this structure centers tool 50a thereby optimizing annular space 50b. This eliminates any transverse motion of tool 50a within tube 22 thereby maintaining a consistent fluid flow from the end of tube 22.

Quick coupling portion 26 of the sheath is socket 112 which comprises socket housing 32 of body 30 and release actuating sleeve 170, best seen in FIG. 6a. The construction and operation of quick coupling portion 26 is best understood by reference to FIGS. 6a and 7 showing, respectively, enlarged elevational views in cross-section of one embodiment of quick coupling portion 26 in locked configuration and another embodiment in released configuration.

Figure 6B:
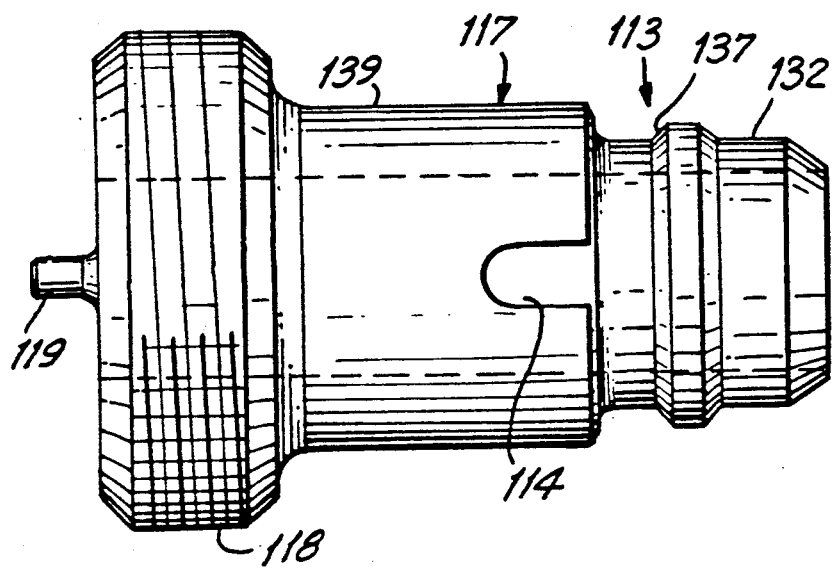

Socket 112 is adapted to mate with a hollow, generally cylindrical adapter or plug member 113 of the form shown in FIG. 6b. The plug member shown may be used to adapt conventional arthroscopes and other tools to the present invention. Alternatively, socket 112 may be used with a plug member 113a (best seen in FIG. 7) integrally formed with an arthroscope (or other tool), thus obviating the need for an adapter.

Plug member 113 is shown in FIG. 6b rotated 90° with respect to the orientation of socket 112 shown in FIG. 6a in order to clearly show keyway 114 intended for receiving key 116 which is press-fit into the body of the socket. The key enables a user to assemble the socket and plug by merely rotating and pushing the plug member relative to the socket until key 116 enters keyway 114, thereby ensuring proper alignment. Plug member 113 is either attached to or integrally formed with adapter 117 which is provided with threads 118 adapted to receive a conventional arthroscope or another desired tool. Tab 119 enables proper alignment of adapter 117 with the arthroscope or tool.

Socket 112 comprises cylindrical housing 32 (formed into frame 30) having an open interior 122, a front end 124 and a rear end 126. The designations "front" and "rear" are used for convenience to clarify the orientation of the socket during use. Front end 124 is disposed toward the operating area while rear end 126 is the end of the socket which receives plug member 113 and any associated tool attached thereto. In the embodiment of an arthroscopic sheath, the front end is attached ultimately to tube 22. In other embodiments, for applications other than arthroscopy, the front of socket 112 may be connected to a selected member such as a water hose or other conduit depending upon the application.

Interior 122 is aligned on axis 38 and is bounded by a cylindrical surface adapted to receive the various corresponding portions of plug member 113 in order to produce a well-aligned, close tolerance fit between the socket and plug member which is sealed by gasket 128. Accordingly, portion 130 of housing 32 has an internal diameter adapted to receive portion 132 of plug member 113. Shoulder 137 of the plug member is adapted to be retained by portions 138 on each of the retaining pins 152, described below. Body 139 of the plug member is adapted to be received in bore 140 of the socket. It is the internal diameter of bore 140 which is the dimension utilized in the determination of the ratio of outside to inside diameters of the socket.

Housing 32 is provided with a plurality of annularly spaced, angled and radially extending throughbores 150, the most radially outward end of each of which is skewed away from the rear end of the socket. In the preferred embodiment, there are six such throughbores 150, each of which is adapted to receive a solid locking pin 152. Each pin is generally cylindrical having an axis 154, a first end surface 156, a second end surface 158, and a rearwardly facing notch 160 provided with surfaces 162 and 164. Functions of these various surfaces will be more clearly described below.

A slidable actuating sleeve assembly 170 is coaxially mounted on cylindrical housing 32 and comprises inner and outer actuating sleeves 172 and 174 which are, in the preferred embodiment, threadably secured together at 176. Placing actuating sleeve 170 on the exterior of housing 32 facilitates the construction of socket 112 with close tolerances between plug member 113 and the socket interior, thereby enhancing alignment. Proper alignment is especially necessary in arthroscopic applications. No intermediate slidable actuating sleeve is necessary as with some prior art quick couplings. Placing the actuating sleeve exclusively on the exterior also enables the use of key 116 and the construction of a quick coupling device significantly smaller than prior art devices as will be understood below.

Inner actuating sleeve 172 is provided with a rear annular flange 178, adapted to be slidable along the external surface of housing 32, and a front actuating end 180 having an annular tip 181 adapted to operatively engage the notches of each of the pins 152. Outer actuating sleeve 174 has a rear end 182 which, when sleeves 172 and 174 are joined together forms a smooth junction 184 therebetween. Outer actuating sleeve 174 has a front end 186, the internal side of which provides an angled annular surface 190 adapted for operative engagement with surface 158 on each of the pins 152. Sleeve 174 also has a front longitudinally extending annular surface 188 adapted for slidable engagement with portion 189 on the exterior surface of cylindrical housing 32. Surface 188 and portion 189 should be sized so that mutual contact is maintained throughout the longitudinal range of motion of outer actuating sleeve 174. Annular flange surface 187 provides a stop to rearward motion of actuating assembly 170. Actuating sleeve assembly 170 is normally biased rearwardly by spring 192 interposed between the rear flange 178 and a radially extending flange 194 formed into the exterior of housing 32. It will be understood that, as spring 192 biases actuating sleeve assembly 170 rearwardly, surface 190 will urge all of the pins 152 radially inwardly toward the interior of socket 112. Each pins 152 is prevented from falling into the interior 122 by its engagement with rear end tip 181 of the inner actuating sleeve 172 and, in case of a pin breaking, by projection 196 formed at the end of each hole 150 in housing 32. While in the preferred embodiment projections 196 are discrete projections, each one separate from the others, these projections could be joined to form, for example, an annular rim.

The various shape of pins 152 produces various surfaces which enhance the operation of socket 112. Since all pins 152 are identical, only one pin will be described in detail. Surface 156 is normal to axis 154 and adjacent surface 138 on the pin's cylindrical wall, the latter surface engaging shoulder 137 of plug member 113 when the socket is in a locked configuration. Surface 138 is engaged by surface 137 of the plug member, as will be understood below. Surface 158 is angled with an angle 200 relative to the normal to axis 154 in order to produce a compact quick coupling design to minimize the outside diameter of outer sleeve 174 and to prevent rotation of pins 152 about their axes. It is necessary to prevent pin rotation in order to prevent binding the moving components by maintaining proper orientation between the notches 160 and end 180 of inner actuating sleeve 172. In the preferred embodiment, angle 200 is on the order of 10° to 20°. Each notch 160 is generally facing rearwardly in order to enable outer notch surfaces 164 to be slidably engaged by annular tip 181 as inner actuating sleeve 172 is moved against the bias of spring 192 toward front end 124. This action causes each pin 152 to slide radially outwardly within its throughbore 150 thereby moving end surfaces 156 radially outwardly sufficiently to clear plug member 113 and enable it to be inserted or removed from socket 112. Surface 164 of notch 160 is also angled with respect to the normal to axis 154 and, in the preferred embodiment, this angle is approximately the same as angle 200. Some shallow angle is desirable in order to increase the leverage of the releasing sleeve to make the pins easier to move when they are held under tension as in a locked configuration.

It will be understood at this point that the invention facilitate one-handed operation of the sheath. For example, insertion of an arthroscope into socket 112 is possible without retracting actuating sleeve assembly 170. Merely inserting a plug member 113 into socket 112 causes pins 152 to move sleeve assembly 170 until the plug pins are able to slide down surface 137, locking the plug member in place. This operation is considerably easier than with prior art devices.

The notch in each pin is shaped to be complementary to the shape of annular tip 181. This is best seen in FIG. 7 which shows an alternative embodiment 212 of a socket, similar in most respects to socket 112 except that it further comprises an annular rear ledge 214 in the outer surface of the housing 232. Rear ledge 214 serves as a stop to the forward motion of actuating assembly 270. Socket 212, by having both front and rear stops, prevents excessive force being applied to pins 152 at the extremes of their range of motion especially in the released position, when sleeve tip 181 would press into pin slot 160 against its roots.

The operation of the invention by enabling actuating sleeves 170 and 270 to act upon notches at the radially outward ends of pins 152 enables the construction of a socket with a relatively small ratio of outside to inside diameter. The pins may have a smaller diameter because the operative surfaces of the pin notches and the actuating sleeve interact over a large bearing area, thus reducing stresses on the pin while preventing cocking or binding of the pin. Additionally, the invention enables the use of a relatively large number of annularly spaced locking pins, each of which may be smaller than if fewer pins were used, thereby widely distributing the forces acting upon the pins and decreasing the force on each pin.

It will be understood that the quick coupling features of the invention are equally adaptable to other than arthroscopic applications and, while the arthroscopic field was chosen to describe the operation of a preferred embodiment of the invention, the invention is not intended to be so limited.

It will be understood by those of ordinary skill in the art that numerous improvements and other modifications may be made to the preferred embodiment of the invention disclosed herein without departing from the spirit and scope thereof.

What is claimed is:

1. In an arthroscopic sheath having an elongated hollow tube for receiving an elongated arthroscopic tool therein, a fluid irrigation portion for receiving a fluid and guiding it into a cylindrical space between the tool and the hollow tube, said fluid irrigation portion comprising a plurality of circumferentially spaced fluid inlet bores to impart an axial flow to said fluid, the improvement comprising:

each of said fluid inlet bores being inclined a predetermined amount in the same arcuate direction for imparting to said fluid a spiral path within said cylindrical space, the amount of inclination being sufficient to assure that the axes of said bores do not intersect said axis of said sheath.

* * * * *